United States Patent [19]

Wolfe

[11] 3,968,003
[45] July 6, 1976

[54] PROCESS OF RECOVERING POLYMERS FROM THEIR SOLUTIONS

[75] Inventor: Anthony C. Wolfe, Los Alamitos, Calif.

[73] Assignee: Shell Oil Company, Houston, Tex.

[22] Filed: Aug. 29, 1974

[21] Appl. No.: 501,539

[52] U.S. Cl............................ 159/48 R; 159/4 VM; 159/16 S; 159/DIG. 10; 159/4 ST; 260/880 R
[51] Int. Cl.²...................... B01D 1/16; B01D 1/14; C08L 9/00
[58] Field of Search.......... 159/DIG. 10, 16 S, 47 R, 159/48 R, 48 L, 4 R, 4 A, 4 B, 4 VM; 450/774.5; 260/33.6, 94.7 R, 93.7; 34/37

[56] References Cited
UNITED STATES PATENTS

| | | | |
|---|---|---|---|
| 1,830,174 | 11/1931 | Peebles | 159/4 R |
| 2,232,544 | 2/1941 | Lorenz | 159/4 R |
| 2,575,119 | 11/1951 | Peebles et al. | 159/4 R |
| 3,202,647 | 8/1965 | Todd et al. | 159/DIG. 10 |
| 3,246,683 | 4/1966 | Yap et al. | 159/DIG. 10 |
| 3,365,808 | 1/1968 | James, Jr. et al. | 159/DIG. 10 |
| 3,469,617 | 9/1969 | Palmason | 159/DIG. 10 |
| 3,644,263 | 2/1972 | Burke, Jr. | 260/29.7 EM |
| 3,772,262 | 11/1973 | Clementi | 159/DIG. 10 |
| 3,804,145 | 4/1974 | Arnold et al. | 159/48 R |

FOREIGN PATENTS OR APPLICATIONS

| | | | |
|---|---|---|---|
| 668,693 | 8/1963 | Canada | 159/DIG. 10 |
| 1,007,914 | 10/1965 | United Kingdom | 159/DIG. 10 |

Primary Examiner—Jack Sofer

[57] ABSTRACT

In the process of isolating and recovering polymers in the powder form from their solutions which comprises contacting the polymer cement with steam in a high shear mixer and passing the resulting mixture into a cyclone separator, the invention which comprises an improved method for varying the size of the polymer particle while still maintaining the residual solvent level.

8 Claims, 1 Drawing Figure

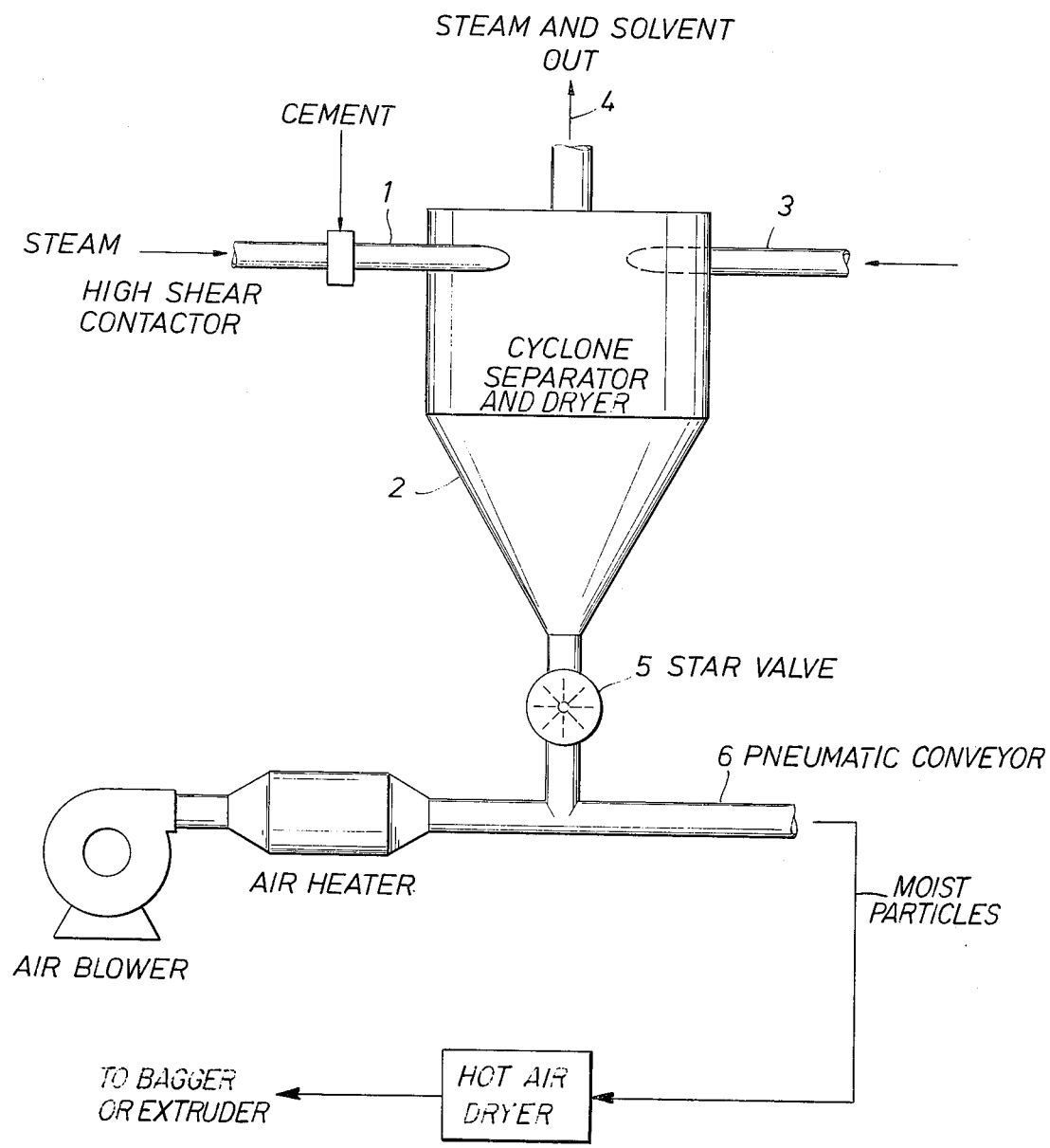

PROCESS OF RECOVERING POLYMERS FROM THEIR SOLUTIONS

BACKGROUND OF THE INVENTION

It is known that useful polymers which are either elastomeric or non-elastomeric in general properties may be produced in solution using such catalysts as lithium hydrocarbyls, specifically lithium alkyls. Once having synthesized the polymer in solution, it then becomes necessary to provide an adequate means and apparatus for isolating the polymer from its solvent. With certain polymers such as conjugated-diene-homopolymers, this may be effected by contacting the polymer solutions (cements) with saturated steam under relatively low total mass flux conditions designed to flash off the bulk of the solvent, dropping the polymer crumb so formed into a hot water bath to degas the polymer, draining the water and subjecting the polymer crumb to drying conditions such as in a moving belt tunnel arrangement. While this is satisfactory for certain polymers, the crumb so formed is relatively coarse and tends to retain substantial proportions of the solvent as well as to be highly saturated with water at the beginning of the drying operation. Moreover, many polymers cannot be treated this way since they tend to agglomerate due to the combination of residual solvent and elevated temperatures so that the products obtained are large sticky masses which are essentially impossible to effectively devolatilize and dry.

To overcome this problem a low cost process for separating and recovering polymer particles was invented which comprised: (a) feeding steam into a high shear mixing zone of the central section of a cylindrical casing, (b) feeding a film of polymer solution having a viscosity of 20–10,000 cp. into the high shear mixing zone, the solvent of said solution having a maximum boiling point below the temperature of the steam, the steam temperature being below that at which the polymer will show evidence of appreciable decomposition under the conditions of high shear contact, the ratio of steam to solution and the residence time in the mixing zone being sufficient to vaporize at least about 90% of the solvent, whereby the polymer is isolated from solution as powdered particles; (c) contacting the steam and solution under high shear conditions; (d) passing the sheared mixture to a cyclone separation zone wherein the powdered polymer which may either agglomerate or remain finely divided is separated from steam and vaporized solvent; (e) removing residual solvent; and (f) removing residual water from the particles. This process is described in U.S. Pat. No. 3,804,145, issued Apr. 16, 1974, which is incorporated by reference herein.

It is desired that the level of residual solvent that remains with the polymer be below about 2.0 phr (parts per hundred), preferably below about 1.8 phr and most preferably below about 1.5 phr in order to effectively operate the hot air dryers. If the residual solvent is above these levels there is a tendency to agglomerate and foul up the hot air dryers. To achieve this level in the above process it had previously been thought necessary to contact the cement and steam in the high shear mixing in a cement to steam weight ratio of about 1:1.5, preferably about 1:1.3 most preferably about 1:1. The maximum amount of steam necessary is determined by economical factors in part the less steam used the lower was the cost. But the minimum amount of steam used is dependent on the minimum amount of residual solvent that can be tolerated in the hot air drying stage of the process. Therefore in order to obtain a less than about 1.5 phr solvent level it has been found necessary to use between about 1.0 to about 1.5 pound of steam for every pound of cement.

Previously, all of this steam was passed into the cyclone separator via a high shear mixing chamber, i.e., the steam and polymer solution (cement) were contacted before entering the cyclone. The steam to cement ratio passing into the high shear mixer determined the size of the resulting polymer particle. Since the residual solvent level must be below about 2.0 phr in order to operate the hot air dryer, the steam to cement ratio passing through the high shear mixing chamber was thought to be fixed at about between 1:1 and about 1.5:1 thereby fixing the size range of the recovered polymer particle. In some cases the resulting particle was too small, resulting in difficulty in handling and transporting the particles. This problem was especially true in the case of the two-block styrene/hydrogenated-isoprene A-B block copolymers.

It has now been found that both the recovered polymer particle size and the residual monomer level are simultaneously controlled by introducing the amount of steam necessary to produce the desired solvent level simultaneously through two separated inlets. The steam to cement level entering the cyclone separator via the contactor is reduced to a point where the desired particle size is obtained. That part of the steam which was not part of the stream entering via the steam contactor is introduced into the cyclone by a separate steam inlet. This allows one to control the size of the particles, yet still maintain the through-put of the devolitization system and the minimum residual solvent level needed to efficiently operate the hot air dryer stage of the process.

SUMMARY OF THE INVENTION

In the process of removing solvent from solution polymers which comprises passing a polymer cement and steam via high shear contactor into a cyclone, separating the powder from the steam/solvent vapor and removing substantially all of the residual solvent in a hot air dryer, the present invention is a method for controlling the powder particle size while simultaneously maintaining the low residual solvent level needed to efficiently operate the hot air dryer. The improved method comprises varying the steam to cement ratio passing into the cyclone via the high shear mixer from about 0.3:1 to about 1:1 by weight and separately feeding from about 0.3 to about 1 part by weight steam, based on weight cement being introduced, into the cyclone via a separate inlet.

DESCRIPTION OF THE PREFERRED EMBODIMENTS

The drawing shows the apparatus used to carry out the process of this invention.

This invention is a method for controlling the size of solid polymer particles and the residual solvent/condensed steam content of said particles in the process for recovering polymers from their solutions which comprises passing the polymer cement and steam into a cyclone via a high shear mixing zone and separating the solvent vapor and steam from the solid polymer particles while in the cyclone and passing the particles into a hot air drying system to substantially remove the residual solvent and condensed steam. The method of this invention comprises passing the cement and only part of the steam necessary to remove the solvent to the required level into the cyclone via the igh shear mixer and passing the remainder of the required steam needed to remove the solvent to the desired level through a separate inlet not in contact with the cement but directly in contact with the polymer particles in the cyclone.

The cement to steam ratio passing through the mixer determines the size of the solid polymer particle. Previously it was believed that the ratio of steam to cement passing through this high shear mixer also determined the residual solvent level. It has now been found that the ratio of steam to cement passing through the high shear mixer can be varied within certain limits so as to vary the size of the particles but the desired residual solvent level can be obtained by introducing a second portion of steam into the cyclone so that it contacts particles separately from the steam/cement high shear mixer stream.

This polymer recovery method together with the method for controlling particle size is useable with any polymer/solvent cement system which can withstand the high temperature steam and hot air contact without decompositing or cross-linking. It is especially good with polyolefin/hydrocarbon cements, polyalkenyl aromatic polymers/inert solvent cements, polyconjugated diene polymer/hydrocarbon cements, copolymers and block-polymers of conjugated diene and alkenyl aromatic hydrocarbons in inert solvents and the hydrogenated and partially hydrogentated derivatives of the above co- and block polymers in inert solvents. The preferred cements are the two and multiblock alpha alkenyl aromatic hydrocarbon/conjugated diene polymers and selectively or totally hydrogenated derivatives of said block polymers in a hydrocarbon solvent. The particularly preferred cements are the polystyrene/polybutadiene, polystyrene/polyisoprene, polystyrene/polybutadiene/polystyrene, polystyrene/polyisoprene/polystyrene block copolymers or their hydrogenated or partially hydrogenated derivatives.

The cement concentration may vary from about 5 percent polymer to about 60 percent polymer by weight. More preferred are cements which vary from about 20 percent polymer to about 50 percent polymer by weight. Particularly preferred are cement concentrations from about 40 percent polymer to about 50 percent polymer by weight.

The molecular weight of the polymers used in the present invention depends on the type of polymer to be devolatilized and recovered. The molecular weight must be low enough to obtain about a 5 percent polymer solution. The combination of the molecular weight and the types of monomers which make up the polymer must be such that the particles formed in the cyclone are not tacky at the temperature chosen to operate the process.

The steam which enters the high shear mixer must be in a temperature range between about 150° and about 225°C, preferably between about 150° and about 200°C and most preferably between about 160° and 190°C. The pressure of the steam which enters the high shear mixer must be between about 50 psig and about 150 psig, preferably between about 50 psig and about 100 psig and most preferably between about 50 psig and 75 psig.

The steam entering directly into the cyclone through the separate second inlet does not have to have any critical temperature or pressure.

The ratio of steam to cement which enters the cyclone via the high shear mixer may vary from about 0.3:1.0 to about 1.5:1.0. The lower limit is determined by the problem of obtaining discrete particles. At steam to cement ratios substantially lower than 0.3:1.0 the polymer no longer forms discrete particles but forms large agglomerates.

The maximum ratio is determined by economics and the ability of the cyclone to remove the solvent vapor and steam. The higher the steam to cement ratio in the shear mixer the smaller the particle size. This size is somewhat dependent on polymer/solvent type, cement concentration and steam temperature but, by far, the most influential method of varying the polymer size can be achieved by varying the steam to cement ratio. Acceptable particle sizes have been achieved at steam/cement ratios from about 0.3:1.0 to about 1.0:1.0, preferably between about 0.5:1.0 and about 1.0:1.0 and most preferably between about 0.5:1.0 and about 0.8:1.0. The total amount of steam contacting the polymer in the cyclone, i.e. the sum of the steam contacting the polymer via the high shear mixer and the second separate steam inlet is determined by the minimum desired residual solvent and water and economics.

The residual solvent and water level in the crumb must be less than about 2.0 phr in order to efficiently remove it via hot air treatment. The minimum amount of steam expressed in steam to cement needed to achieve this level is about 1.2:1.0. This means the minimum amount of steam entering the cyclone via the second separate steam inlet, expressed in steam to initial cement ratio, is about 1.0:1.0 to about 0.2:1.0, preferably about 1.0:1.0 to about 0.5:1.0 and most preferably about 1.0:1.0 to 0.7:1.0. It is evident that the object is to maintain the total steam to cement ratio entering the cyclone at about 1.5:1.0 or the minimum necessary (minimum cost) to achieve the desired residuals level.

The second separate steam inlet may enter the cyclone at any point with acceptable results being obtained when the second separate steam inlet enters the cyclone at the top with the direction of the steam flow being the same as the direction of the particle flow.

The following embodiments are given to further describe and illustrate the improved process of this invention. These embodiments are for the sole purpose of illustrating the invention and are not to be taken as limiting the scope of said invention.

The process of this invention is described below with reference to the accompanying drawing. Steam and cement in a steam to cement weight ratio of from 0.5:1.0 to 1.0:1.0 are fed through the high shear contactor 1 (such as one described in Arnold et al U.S. Pat. No. 3,804,145) into the cyclone separator 2. The steam is at a temperature of from about 150° to about 225°C. The concentration of the cement entering the high shear separator is from about 5 to about 60 percent by weight polymer. Polymer particles are formed as the steam and cement mix and enter the cyclone 2 due to the evaporation of the cement solvent. Simultaneously, as the steam/cement mixture is introduced into the cyclone 2, steam is introduced into the cyclone 2 via a separate steam inlet 3 and this steam contacts the polymer particles, driving off more solvent. Vaporized solvent and steam are removed from the cyclone 2 via exit 4 while polymer particles containing less than about 2% by weight of solvent and water exit cyclone 2 via star value 5 and conveyor 6. The crumb can be bagged as is, further dried in a tray or drying tower and/or extruded into pellets.

ILLUSTRATIVE EMBODIMENT I

The following set of experiments illustrates the variation of polymer particle size achieved with a two block polystyrene/completely hydrogenated polyisoprene copolymer cement. The polymer concentration in each was 16 percent by weight. The steam temperature was 160°C. The total steam to polymer cement weight ratio is held substantially constant. The steam to cement weight ratio entering the cyclone via the high shear contactor and the second separate steam inlet were as shown in Table I. All polymers were subjected to the same drying treatment following primary cyclone treatment.

TABLE I

| Steam to cement ratio by weight via high shear mixture | Steam to "cement" ratio by weight via second separate inlet into cyclone | Particle diameters (microns) | % Residual Solvent |
|---|---|---|---|
| 1.5:1.0 | 0.0:1.0 | 600 | 0.4 |
| 1.0:1.0 | 0.5:1.0 | 900 | 1.0 |
| 0.8:1.0 | 0.7:1.0 | 1100 | 1.2 |
| 0.5:1.0 | 1.0:1.0 | 1300 | 1.5 |

I claim as my invention:

1. In the process for the recovery of polymers from their solutions which comprises mixing steam of at least 50 psig and polymer cement in a high shear mixing-contacting zone whereby part of the solvent is vaporized and solid polymer particles are formed, passing the mixture of particles, cement, vaporized solvent, and steam to a cyclone separation, whereby further solvent vapors are released therein and all vapors and steam are separated from the resulting polymer particles, said particles bearing condensed steam and residual solvent in minor amounts being conveyed to a hot air dryer where the residual solvent and condensed steam are removed, the improvement in controlling the recovered polymer particle size which comprises tangentially feeding steam and polymer cement into said high shear mixing-contacting zone in a steam to cement weight ratio of from about 0.5:1.0 to about 1.0:1.0 where the cement has a polymer concentration from about 5 to about 60 percent by weight and the steam is at a temperature between about 150°C and about 225°C and a pressure between about 50 psig to about 100 psig and passing the high shear contacting zone product to said cyclone separation for additional vaporization and thereby forming additional particles as the sheared product enters the cyclone separator and tangentially feeding a second quantity of steam through a separate steam inlet into the cyclone separator expressed in steam to initial cement weight ratio of from about 1.0:1.0 to 0.5:1.0 thereby reducing the residual solvent and condensed steam level of the resulting particles to below about 2.0 parts per hundred polymer.

2. The improvement of claim 1 where the polymer is a polystyrene/hydrogenated polybutadiene/polystyrene block copolymer.

3. The improvement of claim 1 where the steam entering the high shear contactor is at a temperature between about 150° to about 200°C.

4. The improvement of claim 3 where the polymer particle size is from about 1300 microns to about 900 microns.

5. The improvement of claim 1 where the cement fed through the high shear contactor has a concentration which varies from about 40 to about 50 percent by weight polymer.

6. The improvement of claim 5 where the polymer is a polystyrene/hydrogenated polyisoprene two block copolymer.

7. The improvement of claim 5 where the polymer is a polystyrene/hydrogenated polybutadiene two block copolymer.

8. The improvement of claim 5 where the polymer is a polystyrene/polybutadiene/polystyrene block copolymer.

* * * * *